UNITED STATES PATENT OFFICE.

RURIC C. ROARK, OF CHICAGO, ILLINOIS, ASSIGNOR TO U. S. SANITARY PRODUCTS CORPORATION.

DEODORIZING MATERIAL.

1,346,337.     Specification of Letters Patent.     Patented July 13, 1920.

No Drawing.     Application filed October 23, 1918. Serial No. 259,313.

*To all whom it may concern:*

Be it known that I, RURIC C. ROARK, a citizen of the United States, residing at Chicago, in the county of Cook and State of Illinois, have invented new and useful Improvements in Deodorizing Materials, of which the following is a specification.

This invention has for its object to provide a new composition of matter for deodorizing purposes in toilets, bath rooms, washrooms, street cars, railway cars, theaters and all other buildings or places where bad odors arise from poor ventilation, crowded conditions or other causes.

The base or principal ingredient of the composition is paradichlorbenzol $p(C_6H_4Cl_2)$, the same being an odoriferous, volatile solid, evaporating without leaving any residue when exposed to the air, and insoluble in water, but soluble in benzol, kerosene, alcohol, chloroform, carbon tetrachlorid and other organic solvents.

The deodorizing property of the paradichlorbenzol may be increased by the addition of one or more of the following substances—camphor, nitrobenzol, essential oils, perfume, thymol, menthol, naphthalene or other odoriferous substances. The paradichlorbenzol itself has deodorizing properties, but the same is greatly augmented when an essential oil or other odoriferous substance is added, the paradichlorbenzol acting as a base or solvent for such substances.

The composition is made up in molds in solid cake form, which are placed in a metal box having perforations, so that through evaporation the odor is disseminated into the air.

I claim:

1. As a new article of manufacture, a deodorizing material consisting of a volatile substance in solid cake form having for its base paradichlorbenzol, the substance having the property of evaporating without leaving a residuum when exposed to the air.

2. As a new article of manufacture, a deodorizing material consisting of a solid cake of paradichlorbenzol and an odoriferous substance incorporated therewith.

3. As a new article of manufacture, a deodorizing material consisting of a solid cake of paradichlorbenzol.

In testimony whereof I affix my signature.

RURIC C. ROARK.